LIGHT VALVE IMAGE PROJECTION SYSTEM WITH DEFORMABLE MEMBRANE AND THIN FILM TARGET ELECTRODE

Filed Nov. 13, 1967 3 Sheets-Sheet 1

TATSUYA YAMADA & SHUNICHI SANO,
BY
INVENTORS
by Stephen H. Frishauf
Atty

June 23, 1970 TATSUYA YAMADA ET AL 3,517,126

LIGHT VALVE IMAGE PROJECTION SYSTEM WITH DEFORMABLE MEMBRANE AND THIN FILM TARGET ELECTRODE

Filed Nov. 13, 1967 3 Sheets-Sheet 2

United States Patent Office 3,517,126
Patented June 23, 1970

3,517,126
LIGHT VALUE IMAGE PROJECTION SYSTEM WITH DEFORMABLE MEMBRANE AND THIN FILM TARGET ELECTRODE

Tatsuya Yamada, Kawasaki-shi, and Shunichi Sano, Tokyo, Japan, assignors to Tokyo Shibaura Electric Co., Ltd., Kawasaki-shi, Japan, a corporation of Japan Filed Nov. 13, 1967, Ser. No. 682,237
Claims priority, application Japan, Nov. 17, 1966, 42/75,247; May 12, 1967, 42/29,774, 42/29,775; Jan. 13, 1967, 42/2,177; Sept. 12, 1967, 42/58,113
Int. Cl. H04n *5/74;* H01j *29/12;* G02f *1/32*
U.S. Cl. 178—7.5 6 Claims

ABSTRACT OF THE DISCLOSURE

In a projection system a grid shaped thin film electrode having numerous regularly spaced gaps is interposed between a lightmodulating film to which a light beam is impinging and a substrate receiving an electron beam, whereby the light beam passing through the gaps of the grid shaped electrode projected to upon a screen to obtain a clear and bright projected picture.

This invention relates to a projection system to enlarge and project optical images upon a screen.

Certain types of picture projecting system utilise a lightmodulating medium as a light valve.

This invention relates particularly to a projection system wherein a lightmodulating medium is disposed in a sealed-off evacuated enclosure, said medium being associated with a well known optical system to form an electric charge pattern corresponding to an image signal and capable of deforming owing to the charge pattern.

Among these projection systems utilising such a light valve are included Eidophor, light valve, thermoplastic recoder, and the like. However, in these well known devices, since the electron beam impinges directly upon the lightmodulating medium there is a tendency that the deformable medium comprising the lightmodulating membrane becomes degraded, with the result that it is necessary to use suitable means to constantly supplement and renew the medium. Where the medium is comprised by a liquid, a portion thereof tends to vapourise so that it has been required to maintain the atmosphere in the vicinity of the lightmodulating membrane under a constant gas pressure by an evacuating mechanism. As a result such projecting system is more bulky, complicated and expensive than an ordinary image display device such as a television receiver, so that its practical use has been limited.

When above described projecting system is used to project television signals, for example, it is necessary to modulate the electron beam so that the lightmodulating membrane can deform at the spacial frequency of a carrier wave higher than that of the image signal. In other words it is not sufficient to merely effect intensity modulation of the electron beam with the image signal as in a conventional cathode ray tube but it is required to be modulated with a signal that is obtained by effecting amplitude modulation of a carrier wave having a higher frequency than image signals with the image signal. To accomplish this a special modulating apparatus is required. Further, when it is desired to record a desired pattern in a short time as in the case of recording an electrical signal obtained by a scanning system different from that of television or in the case of recording the output of an electronic computor it is not practical to use above described image recording and projecting device.

As an improved projecting device free from the above described defects, an electrostatic printing tube type projection system was developed as described in a report AD 628,133 issued by the Government of U.S.A. In this type, a light modulating membrane of the construction described above is mounted on the outer surface of a face plate of the electrostatic printing tube. The face plate is constructed such that groups of a plurality of thin conductors are embedded in a glass plate like a mosaic. However, fabrication of a face plate having such construction is very difficult. Thus, since it is necessary to embed in the face plate a plurality of fine electrode conductors of the number corresponding to the desired resolution, fabrication of the face plate of large conductor densities is extremely difficult so that the practical limit of the density is 100 conductors 1 cm., thus limiting the resolution of the image being projected.

There was also proposed a lightamplifier device as disclosed in Japanese patent publication No. 30,310/1964. However, when it is desired to use this lightamplifier device as an electrooptical converter, for example, as a recording and projecting device of the television signals, it is necessary to convert the electrical signal into a light image by some means and then supply it to the lightamplifier device thus making difficult relative adjustment and causing degrading of the characteristic. In addition, it is necessary to provide an electrooptical converter near the lightmodulating membrane of the lightamplifier device, and to form a reflection film on the surface of the lightmodulating membrane so that the construction is complicated and high degree of manufacturing skill is required.

Accordingly, it is the principal object of this invention to simplify the construction of the light modulation membrane and components associated therewith whereby to provide a novel image recording and projecting device which can be readily fabricated.

Another object of this invention is to provide an image recording and projecting device of small size and low cost by employing a sealed-off vacuum tube.

A further object of this invention is to provide a new and improved image recording and projecting device capable of projecting an image at sufficiently high resolutions.

A still further object of this invention is to simplify the modulating means for an electron beam utilised to deform the light modulating membrane.

Yet another object of this invention is to increase the speed of recording and projecting irrespective of the type of the electrical signal to be recorded.

Figure 1:
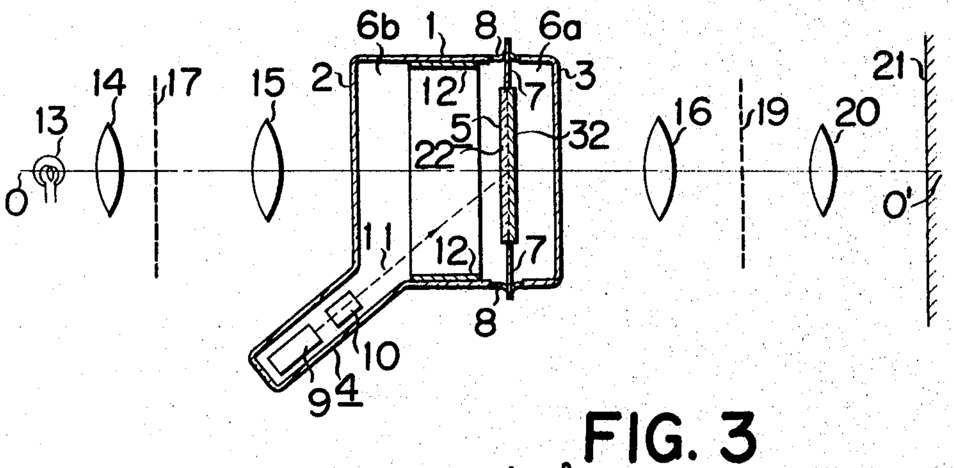
FIG. 1 is a schematic representation of an image recording and projecting device embodying this invention.

Referring now to the accompanying drawings there is shown in FIG. 1 a cylindrical vacuum vessel or envelope 1 made of glass having a diameter of approximately 6.5 cm. and a length of approximately 6.5 cm. Face plates 2 and 3 or the opposite ends are transparent. A cylindrical neck 4 is provided to extend into the envelope 1 at one side end thereof to contain an electron gun. The vacuum envelope is shown as the sealed-off type. The interior of the vacuum envelope 1 as well as the neck 4 is at a gas pressure approximately $10^{-6}$ mm. Hg. The vacuum envelope is divided into two empty chambers 6*a* and 6*b* by a photomodulating member 5, said two chambers being also maintained at the vacuum described above. Although the detailed construction of the photomodulating member 5 will be described later, it has a disc shaped construction and is supported by a metal frame, which in turn is secured to a metal ring 8 adapted to couple said two empty chambers 6*a* and 6*b*.

Electron gun 9 contained in the neck includes a plurality of electrodes adapted to emit an electron beam, effect amplitude modulation thereof, accelerate and focus the beam respectively. A deflection electrode 10 is provided coaxially with the electron gun 9. Further a cylindrical accelerating electrode is formed by a conductive film 12 secured on the inner wall of the vacuum envelope 1 for the purpose of accelerating the electron beam 11. The surface of the light-modulating member 5 is adapted to be microscopically deformed by the action of the electron beam 11.

As shown in the drawing, the lightmodulating member 5 is disposed in a well-known Schlieren optical system to modulate the light flux emanated from a light source 13.

The outline of the Schlieren optical system is as follows: This optical system comprises a plurality of parallel spaced optical elements arranged along its optical axis. More particularly, a condenser lens 14 is provided to focus the light from light source 13 and a first apertured grid 17 is provided to be irradiated by the light flux passing through the condenser lens 14. A second focusing lens 15 is provided between apertured grid 17 and the face plate 2 of said image recording and projecting tube. A focusing lens 16 is disposed on the outside of face plate 3 and a second apertured grid or mask 19 is disposed in front of lens 16. The focal length and the position of said second and third lenses 15 and 16 are selected such that the optical images of the apertures of grid 17 will be focused on the mask 19. The relative position of the two apertured grids 17 and 19 is selected such that when the light passed through the grid 17 passes through non-deformed portions of the lightmodulating member 5 or when the light travels straightly without being modulated it will be intercepted by the opaque portions of the mask 19 whereas when the light transmits through the deformed portions of the lightmodulating member or when the path of light is deflected it will transmit through the perforations of the mask 19. The light transmitted through the mask 19 will be enlarged and projected upon a screen 21 by means of optical lenses 16 and 20 as the recorded image on said lightmodulating member 5.

Figure 2:
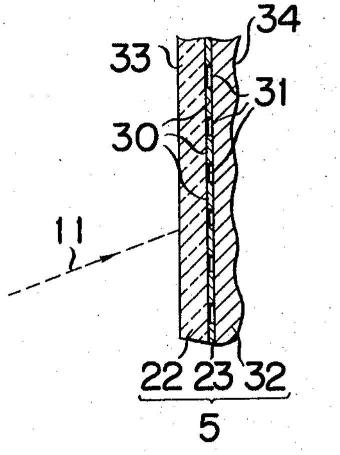
FIG. 2 is an enlarged sectional view of a lightmodulating membrane shown in FIG. 1.
Figure 3:
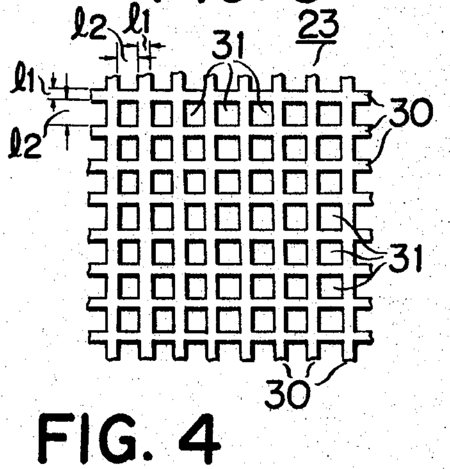
FIG. 3 is a front view of the grid shaped thin film electrode shown in FIG. 2.

The construction of the lightmodulating member 5 will now be described by referring to FIG. 2 which show an enlarged sectional view of a portion thereof. A light transmissive circular disc shaped substrate 22 is made of a suitable dielectric substance, for example, a thin glass sheet containing sodium ions and having a thickness of 5 microns and a diameter of 50 mm. A grid shaped thin film electrode 23 is secured to one surface of the light transmissive substrate 22. As shown in FIG. 3, actually, the grid shaped thin film electrode 23 comprises an aluminum mesh having a thickness of 500 angstrom units, for example, and includes uniformly spaced longitudinal and transversal conductors 30 at a density of 400 conductors/cm., said crossing conductors defining a plurality of openings 31. The width $l_1$ of the conductor 30 is about 5 microns and that $l_2$ of the opening 31 is about 20 microns. To form this thin film electrode 23 on the substrate 22, at first aluminum is deposited on one surface of the glass substrate 22 to a thickness of about 500 angstrom units and then the deposited aluminum film is formed into a mesh by a photoetching technique. With this method a density of conductors of the order of 400/cm. can be readily realised. Finer meshes can also be formed relatively simply. The finer the mesh, the higher is the resolution of the projected image.

Figure 4:
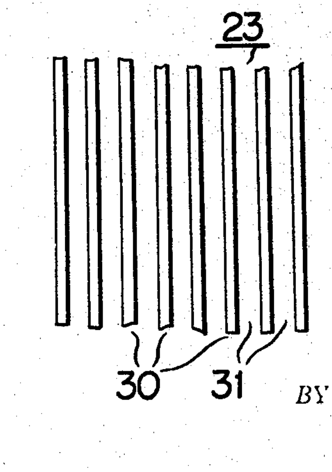
FIG. 4 is a front view of a modified grid shaped thin film electrode.

The grid shaped thin film electrode 23 is not necessary to be in the form of a mesh as shown in FIG. 3 but may be in the form of stripes as shown in FIG. 4. Aluminum stripes of the density of the order of 400 conductors/cm. can also be readily formed by vacuum deposited aluminum and then photoetching. Aluminium conductors 30 are spaced by gaps 31 which are formed by etching. In the stripe construction shown in FIG. 4 it is advantageous to make the stripes parallel to the stripes of masks 17 and 19 of the Schlieren optical system. The term "grid shaped thin film" as used herein not only includes the mesh construction as well as stripe construction shown in FIGS. 3 and 4 but also conductive thin films wherein conductors and gaps are regularly and alternately disposed.

A lightmodulating membrane 32 is formed of the grid shaped conductive thin film electrode 23 on one surface of the glass substrate 22. The lightmodulating membrane 32 may be made of any material which is deformable by an electrostatic field. For example, it may be formed by applying a methyl silicone oil onto the grid shaped thin film electrode 23 to a thickness of approximately one micron. Thus the illustrated lightmodulating member 5 is comprised by at least three layers, i.e. the thin substrate 22, grid shaped thin film electrode 23 and lightmodulating membrane 32. Owing to its simple construction the lightmodulating member 5 could be readily fabricated by any suitable well-known technique such for example as photoetching technique.

The operation of the image recording and projecting device constructed as above described is as follows:

To the various electrodes contained in the vacuum envelope 1 are supplied voltages of the following values from a source of voltage not shown. A negative voltage of 10 kv. is impressed upon the cathode electrode of electron gun 9 while zero volts is applied to the cylindrical electrode 12 and to the grid shaped thin film 23. Strictly speaking, the application of zero volts upon electrode 12 means that the potential of the conductors 30 is maintained at zero volts. Then the source of light 13 is energised to irradiate the lightmodulating member 5, and an image signal containing the desired image information to be projected upon the screen 21 is supplied to the electron gun 9. For example, the image signal may be a television image signal. The television signal supplied to electron gun 9 performs amplitude modulation of the electron beam emanated from electron gun in accordance with the signal. The amplitude modulated electron beam is accelerated, focused and deflected to scan the recording surface 33 of the substrate 22 of lightmodulating member 5. Since electron beam 11 impinges upon the recording surface 33 located on the side opposite to silicone oil film 32, there is no fear that the silicone oil film is bombarded by the electron beam. For this reason evaporation of the lightmodulating membrane 32 as well as degradation of the characteristic thereof can be precluded thus avoiding the necessity of renewing it. The light-modulating membrane 32 is always maintained at a constant vacuum because it is contained in the first vacuum chamber 6*a* hermetically isolated from the side on which bombardment of the electron beam occurs.

A negative charge pattern corresponding to the image signal is recorded on the surface of substrate 22 by the scanning action of the electron beam. Since the grid shaped thin film electrode 23 is formed on the opposite side of the substrate 22, there will be formed an electrostatic field between said negative charge pattern and electrode 23 of its conductors 30. Since the thin film electrode 23 is formed with gaps 31, an electrostatic field will also be formed in the photomodulating membrane 32 through these gaps. Consequently, portions of the photomodulating membrane 32 opposite to gaps 31 of the electrode 23 will be deformed by the action of the electrostatic field to corrugate the surface 34 of the photomodulating membrane 32. The corrugation of the surface 34 of the photomodulating membrane formed in this manner provides a space wave which is formed by amplitude modulation to the negative charge pattern on the recording surface 33 by utilising the space frequency as determined by the spacing between adjacent gaps 31 of the electrode 23 as the carrier wave. Stated in another way, this is equivalent to the intensity modulation of the electron beam by a signal produced by effecting amplitude modulation of a carrier wave having a frequency as determined by the spacing between adjacent gaps 31 of the electrode 23 with said television signal. This carrier wave effects the deformation of the light-modulating membrane 32. It is to be understood that the space frequency which determines the recurrent frequency of said deformation is substantially equal to the carrier frequency. Thus, the whole surface 34 of the lightmodulating membrane will be deformed in accordance with said image.

Inasmuch as the lightmodulating oil film 32 is deformed in accordance with the intensity of the electrostatic field created in each group 31 of the electrode 23 it is not necessary to modulate the electron beam with the carriers frequency, but required to modulate it only with the image signal. Thus, according and projection of the desired electric signal can be readily done without relaying upon highly skilled technique of high frequency.

The light beam emanated from the light source 13 and transmitted through the apertured grid 17 is projected upon the lightmodulating member 5 by the second optical lens 15. When transmitting through the lightmodulating membrane 32, its direction of travel will be deflected in accordance with the deformation of the membrane surface 34. Deflected light beam will pass through the perforations of the aperture grid or mask 19 without being intercepted thereby and then transmit through optical lens 20 to impinge upon the screen 21 to focus thereon the desired optical image. Light beam transmitting through non-deformed portions of the surface 34 of the photomodulating membrane travels straight forwardly without changing its direction of travel so that it will be intercepted by the mask 19 thus not reaching the screen 21.

In the above embodiment it is necessary to select the electrical resistance of the substrate 22 and the viscosity of the silicone oil film 32 in accordance with the signal to be recorded. Thus, for example, where an ordinary television signal is to be recorded and projected it is designed such that, between the scanning of one frame and that of the succeeding frame, the remaining charge of the charge pattern on the recording surface 32 on one side of the substrate will finish to discharge to the grid shaped thin film electrode 23 through the substrate itself, and that the deformed membrane surface 24 will restore to a flat surface. When the period of one frame equals to 60 cycles per second satisfactory result could be obtained be selecting the resistivity of the substrate to be equal to $10^{11}$ to $10^{12}$ Ω-cm. and by selecting the viscosity of the silicone oil to be equal to from 100 to 10,000 cs.

The quality of the projected image was satisfactory. This is caused by the fact that the gap of the grid shaped thin film electrode 23 is narrow as above described. The widths $l_1$ and $l_2$ of the conductors and gaps of the electrode 23 are selected in accordance with the fineness of the charge image to be formed on the recording surface 33.

Where the grid shaped thin film electrode 23 is made of an opaque substance there is a fear of the occurrence of diffraction phenomenon but by greatly reducing the thickness of the conductor 30 this undesirable phenomenon can be reduced to negligible order. The result of experiment shows that by selecting the thickness of the thin film electrode 23 to 100 angstrom units it is easy to make the strength of the diffracted light of the first order to be $\frac{1}{100}$ of that of the diffracted light of the zero order. Although there is no limit or the material of the electrode 23, chromium, gold, silver, aluminium and Nichrome are suitable. Further, by vapour deposition method it is easy to make the thickness of the electrode 23 to be about 100 angstrom units.

While the above example refers to the projection of a television image it will be clear that other signals can also be recorded and projected. Thus, for example, instead of scanning with an electron beam it is able to temporally record a charge image on the recording surface 33 of the substrate 22 by projecting an electron beam flux through a pattern mask having a desired pattern.

Figures 5, 6, 7, 8:
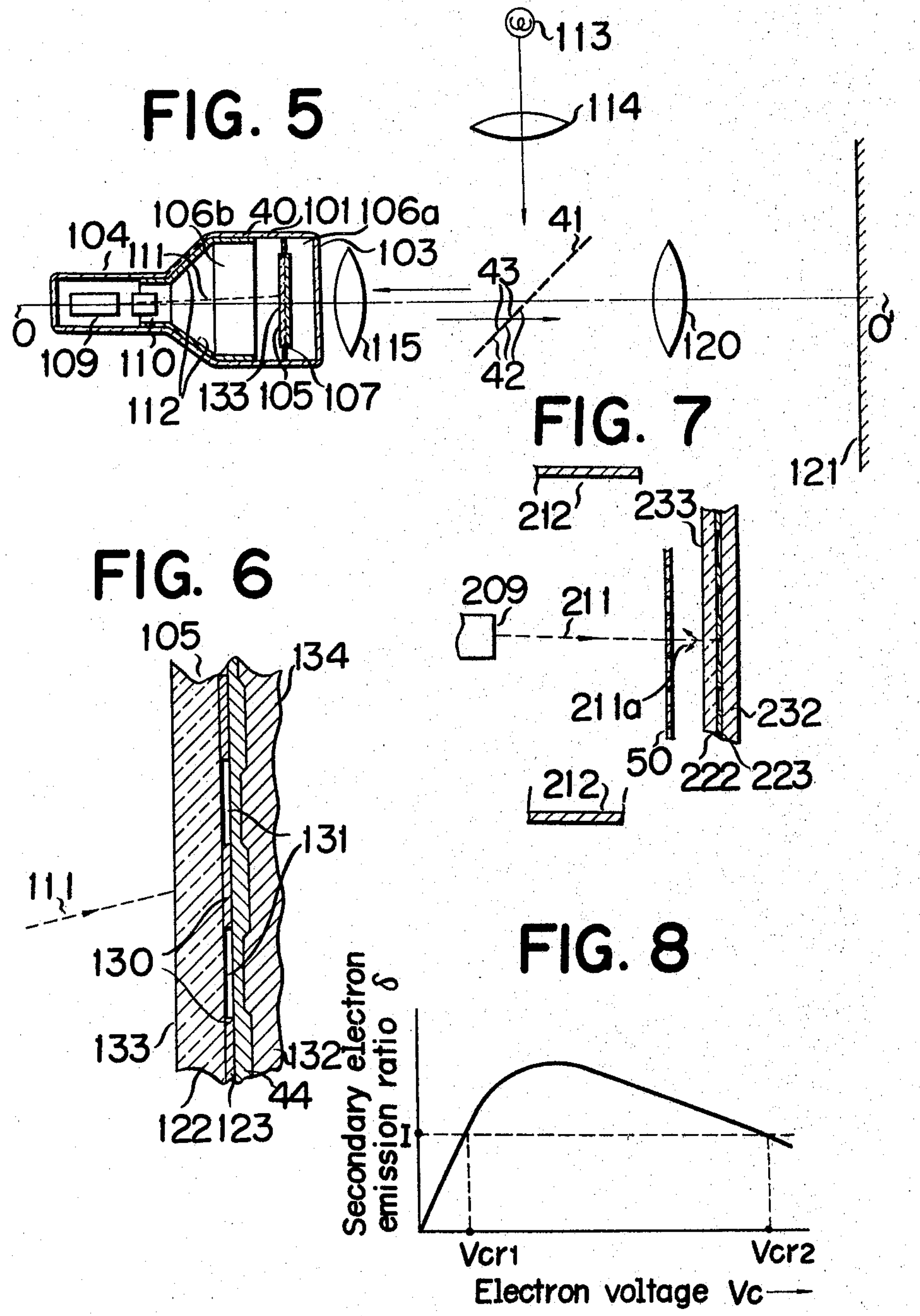
FIG. 5 is a schematic view of a modified image recording and projecting device according to this invention.
FIG. 6 is an enlarged sectional view of the light modulating means shown in FIG. 5.
FIG. 7 is a diagram illustrating another modification of this invention.
FIGS. 8 and 9 show characteristic curves to explain the operation of the device shown in FIG. 7.

FIGS. 5 and 6 show a modification of this invention wherein a reflection type Schlieren optical system is employed as the projecting means. In these figures components corresponding to those shown in FIGS. 1 and 2 are represented numbers obtained by adding 100 to the corresponding numbers. The construction of the vacuum envelope is simplified because in this modification it is not required to transmit the projected light through opposite face plates. Thus, the vacuum envelope 101 made of glass is comprised by a face plate 103, a funnel 40 and a neck 104 as in the conventional cathode ray tube, and the interior thereof is maintained at a gas pressure of the order of $10^{-6}$ mm. Hg. The neck 104 contains an electron gun 109 for emitting an electron beam. A deflection electrode 110 is also contained in the neck 104 to deflect and scan the electron beam. An electroconductive film 112 is deposited on the inner walls of the funnel 40 and neck 104 to form an electrode. A lightmodulating member 105 supported by a metal ring 107 is disposed in the vacuum envelope 101 to divide the interior thereof into two vacuum chambers 106*a* and 106*b*. The metal ring 107 functions to couple together these vacuum chambers and is supported by a portion of the inner wall of the vacuum envelopes 101. An electron beam 111 modulated by a television image signal is directed to impinge upon and scan a recording surface 133 of a substrate 122 of the lightmodulating member 105 whereby a charge pattern corresponding to the television signal is recorded on the recording surface 133. A lightmodulating membrane 132 on the other surface of the substrate 122 is constructed to deform in accordance with the charge image. Further the lightmodulating membrane 132 is constructed such that it will reflect and hence change the path of light beam impinging upon the surface 134 thereof in accordance with its deformation.

The vacuum envelope 101 having the construction outlined hereinabove is disposed in the well-known reflection type Schlieren optical system as shown in the drawing. More particularly, light projected from a source of light 113 is focused by a condenser lens 114 to illuminate a bar mirror system 41 comprising a plurality of spaced apart elongated mirrors 42. The surfaces of these mirrors are arranged in a common plane inclined at an angle of 45° with respect to the optical axis O–O′. Light reflected by respective bar mirrors 42 of the bar mirror system 41 impinges upon the lightmodulating membrane 132 of the vacuum envelope 101 through a lens 115. Incident light beam is reflected by the membrane back to the bar mirror system 41. Said optical elements are positioned in such a relation that the light traveling along the same path as that of the incident light or the reflected light that has transmitted through non-deformed portions of the lightmodulating membrane 132 will be focused on the surfaces of the respective bar mirrors 42 and then reflected thereby back to the light source. Further, the light out of the path of travel of the incident light, or reflected light that has passed through portions of the lightmodulating membrane deformed by the charge pattern will pass through light transmissive gaps 43 between bar mirrors 42 toward a screen 121 via a lens 120. Accordingly the lens 120 will focus an image on the screen 121 corresponding to the deformation of the lightmodulating membrane 132.

In order to have more clear understanding of the light reflecting function of the lightmodulating membrane 132, the detailed construction of the lightmodulating member 105 will be described by referring to FIG. 6. The construction shown in FIG. 6 is substantially the same as that shown in FIG. 2 except that a reflective membrane 44 of a dielectric material is interposed between a grid shaped thin film electrode 123 and a lightmodulating membrane 132. The substrate 122 is comprised by a glass plate having a thickness of 5 microns, a diameter of 50 mm. and a suitable electrical resistance of about $10^{11}$ to $11^{12}$ Ω-cm. In this modification, the substrate 122 may be either light transmissive or opaque. On the surface of the substrate opposite to the recording surface 133 there is formed a grid shaped thin film electrode 123 of a thickness of about several hundred angstrom units by the well-known photo-etching technique, for example. The electrode takes a form of a grid consisting of a plurality of conductors 130 spaced by gaps 131 and at a density of about 400 conductors per 1 cm., said conductors being arranged in a mesh identical to that shown in FIG. 3. The configuration and dimension of the electrode 123 are quite the same as those shown in FIG. 3. Electrode 123 may be in the form of stripes as shown in FIG. 4. A reflecting membrane 144 having a thickness of 1 or 2 microns is formed upon the grid shaped thin film electrode 123 by alternately vapour depositing this film of cerium oxide and magnesium fluoride. A lightmodulating membrane 132 formed on this film 44 is comprised by a methyl silicone oil film of about 1 micron thick in the same manner as said lightmodulating membrane 32.

When the recording surface 133 is scanned by the electron beam 111 modulated by the television signal a charge pattern will be formed corresponding to the image signal. The electrostatic field created by the charge image and the electrode 123 will also be formed across the lightmodulating membrane 132 through electrode gaps 131 whereby the surface 134 of the lightmodulating membrane 132 will be deformed by the electrostatic force. The corrugation of the membrane surface 134 formed in this manner will produce a space wave that is amplitude modulated in response to the charge pattern on the recording surface by utilising the space frequency determined by the electrode gaps 131 as the carrier wave. The light flux from the source of light 113 impinges upon the lightmodulating membrane 132 which has been deformed in response to the image signal. While in the foregoing description it has been stated that the incident light is reflected by the deformed lightmodulating membrane 132, actually, a portion of the incident light is directly reflected and refracted in accordance with the deformation of the surface of the lightmodulating membrane but the majority of the incident light transmits through the membrane 132 and when again passing it after being reflected by the light reflecting film 44 the light will refract or change its path of travel. The reflected light passes through the bar mirror system 41 and is then focused on the screen 121 to form a projected optical image by the action of the lenses 115 and 120. Substantially all of the light from the light source 113 incident upon the lightmodulating membrane 132 enters into it but when the membrane 132 is deformed light entering into the membrane is first refracted and is again refracted when it passes to outside after being reflected by the reflecting film 44. Thus the light is refracted twice, thereby doubling the sensitivity of light modulation.

Further the resolution of the projected image could be improved by increasing the density of the conductors.

As described hereinabove the size of the image recording and projecting device can be decreased by providing a light reflecting film in the vacuum envelope where the reflective type Schlieren optical system is used. The construction of the multilayered reflecting film of a dielectric material is not limited to that shown in FIG. 6 but the same result could be obtained when the reflecting film is interposed between the substrate 122 and the grid shaped thin film electrode 123. More specifically, at first a light reflecting film is formed on the surface of the substrate 122 on the side opposite to recording surface 133 by the alternate vapor deposition of cerium oxide and magnesium fluoride and then the grid shaped thin film electrode 123 and the lightmodulating membrane are successively formed on the light reflecting film.

In either case, the image recording and projecting vacuum envelopes to the embodiments shown in FIGS. 1 to 6 inclusive operate to record a charge image on the recording surface of the substrate by scanning it by an electron beam modulated by a signal to be projected whereby to deform the lightmodulating membrane by the electrostatic force created by said charge pattern and the mesh electrode.

The resistivity of the substrate of the lightmodulating membrane in each embodiment described above should be selected to such a value that the charge pattern initially recorded on the recording surface of the substrate can discharge to the grid shaped thin film electrode through the substrate before the next succeeding signal is recorded.

Advantageously, as the substrate a glass plate containing sodium ions and having a thickness of 5 microns is used. However, utilisation of a glass plate as the substrate not only results in a tendency of decreasing the initial conductivity but also of colouring the glass, thus decreasing the utilisation factor of the light especially when the transmission type Schlieren optical system is utilised.

Such problems are mainly caused by the conduction mechanism of the glass plate comprising the substrate. Thus, the charge image recorded on the recording surface of the substrate gradually discharges to the grid shaped electrode on the opposite side through it. Since the electroconduction mechanism through the glass plate is caused by the mobility of the sodium ions, during operation sodium ions gradually moves from one surface to the other of the glass plate. This results in the decrease of the conductivity of the glass plate, thus imparing the desired function of the glass plate as the substrate. In addition undesirable colouring of the glass plate results. While the above described image recording and projecting vacuum envelopes shown in FIGS. 1 to 6 are satisfactory their useful line can be prolonged by the method to be described hereinbelow.

Considering the occurrence of the aforesaid undesirable colour in the glass plate attributable to the fact that the polarity of the surface charge on the image recording surface is always constant, this invention contemplates to solve this problem by reversing the polarity from time to time. Since the deformation of the lightmodulating membrane of the lightmodulating member is caused by the electrostatic force corresponding to the charge pattern and not normally influenced by the polarity of the charge pattern alternate recording of positive and negative charge pattern does not result in any deleterious effect.

FIG. 7 shows such a modification. In this embodiment as the construction of the image recording and projecting vacuum tube and its arrangement relative to the Schlieren optical system are the same as those illustrated in previous embodiments, only important components of FIGS. 1 and 2 are diagrammatically shown in FIG. 7, and these components are designated by numbers obtained by adding 200 to the numbers of the corresponding components shown in FIGS. 1 and 2.

It is assumed now that the cathode potential of the electron gun 209 is zero volt and that 10 kv. is applied to the cylindrical thin film electrode 212 and the grid shaped thin film electrode 223 respectively. The recording surface 233 of the substrate 222 is bombarded by the electron beam emitted from the electron gun to emit secondary electrons 211$a$ from the recording surface 233 which are collected by an electrode 212. To further improve the collecting efficiency it is advantageous to provide a collecting electrode 50 having coarser mesh than the grid shaped electrode 123 at a position shown in FIG. 7. Collecting electrode 50 is disposed in parallel with the recording surface 233.

As the primary electron beam 211 bombards the recording surface at an electron voltage of 10 kv. which results a secondary electron emitting ratio of less than unity there will be formed a negative charge pattern on the recording surface 233.

As the emission of the electron beam is continued, since current flows through the glass substrate 222 from the grid shaped thin film electrode 223 to the recording surface 233, sodium ions will segregate on the recording surface 233. Thus it is necessary to rely upon a certain means which assures positive charging of the recording surface in the quiescent period of projection. For example, this can be accomplished by scanning recording surface 233 with an electron beam of a constant voltage by applying a voltage, for example, +1.8 kv. to the grid shaped thin film electrode 123 which assures a secondary electron emission ratio larger than unity and by applying a +2 kv. to the collector electrode 50. Under these circumstances, when the electron voltage is close to 2 kv., the potential of the collector electrode would be more positive than that of the grid shaped thin film electrode with the result that the recording surface would be charged positively. As a result, sodium ions that have been segregated on the side of the recording surface 233 will move toward the grid shaped thin film electrode 233 whereby to eliminate the phenomenon of segregation. Such an operation is effective to positively prevent the reduction in the conductivity of the substrate 222 so that it is possible to reapply 10 kv. to the collector electrode 50 and the grid shaped thin film electrode 223 to resume the recording and projecting operation.

While in the above operation the recording surface 233 is positively charged during the quiescent period of projection it may be possible to continue recording and projection by applying 2 kv. to the collector electrode 50 and 1.8 kv. to the grid shaped thin film electrode 223. In other words, the polarity of the charge pattern to be recorded is alternately switched between positive and negative.

To enable continuous recording and projection while the polarity of the change is switched sequentially, the following operations are performed.

More particularly, when 2 kv. is supplied to the collector electrode 50, and when the voltage supplied to the grid shaped thin film electrode 223 is switched between 1.8 kv. and 2.2 kv., the deflection sensitivity would become constant and the switched voltage would vary between ±200 v. so that continuous recording and projection of the charged pattern of the positive and negative polarities could be made readily. Further, switching of the polarity of the charge on the recording surface 233 may be effected for a combination of different values of collector electrode voltage and the voltage of the grid shaped thin film electrode.

As is well known in the art when an electron beam of an electron voltage of V$c$ impinges upon the recording surface 233, the relation between the secondary electron emission coefficient $\delta$ of the recording surface 233 and the electron voltage is generally shown by a curve illustrated in FIG. 8. As shown, this characteristic curve crosses a straight line corresponding to unity secondary electron emission coefficient at two points, so that the secondary electron emission coefficient $\delta$ is larger than unity between the first and second cross voltages V$cr$1, V$cr$2 but smaller than unity in ranges of electron voltages below V$cr$1 and beyond V$cr$2.

Consequently by suitably switching the voltage applied to the collector electrode 50 and the grid shaped thin film electrode 223 with reference to the cathode voltage of the electron gun between an electron voltage which results larger than unity secondary electron emission ratio and an electron voltage which results larger than unity secondary electron emission ratio and an electron voltage which results smaller than unity secondary electron emission ratio, the polarity of the charge on the recording surface 233 of the substrate 222 can be switched to eliminate the segregation of ions.

The relation between the polarity or the direction of charging of the charge pattern and the potential of the recording surface 232 is as follows. When it is assumed that the cathode voltage of the electron gun 209 equals zero, then the direction of shift of the potential Vs of the recording surface 233 bombarded by the electron beam 211 can be schematically shown by FIG. 9. Thus, the potential of the recording surface 233 varies in such a manner that the coordinates (V$s$, V$c$) will shift in the direction as shown by fine arrows when the recording surface 233 on the substrate 222 is bombarded by an electron beam having an electron voltage of V$c$.

When the coordinates lie in a region X defined by a straight line BC representing a condition $Vs=Vcr1$ and a folded line BDE the surface 233 of the substrate 222 will be charged positively or to increase its surface potential V$s$ whereas when the coordinates lie in a region Y other than X the recording surface 233 will be charged negatively or its potential V$s$ will be decreased. This means that potentials V$c$ and V$s$ should be switched such that coordinates (V$c$, V$s$) are suitably switched between regions X and Y. Actually, however, since the voltage V$s$ starts from the voltage V$m$ of the grid shaped thin film electrode 223 itself owing to the conductivity of the substrate 222 or normally tends to balance against this voltage V$m$, V$m$ may be replaced for V$s$ in FIG. 9 so that voltages V$c$ and V$m$ could be switched in order to switch coordinates (V$c$, V$m$) between regions X and Y at a condition of $Vs=Vm$.

Although there are such numerous combinations the actual regions between which V$c$ and V$m$ could be switched are limited to a relatively narrow range because the speed of charging is low when V$s$ is at a value near V$cr$1 or V$cr$2 and because the diameter of the electron beam can be reduced when V$s$ is high.

Thus, the life or durability of the substrate or image recording and projecting vacuum tube can be improved by switching the polarity of the charge image on the recording surface between positive and negative.

Figures 9, 10, 11, 12:
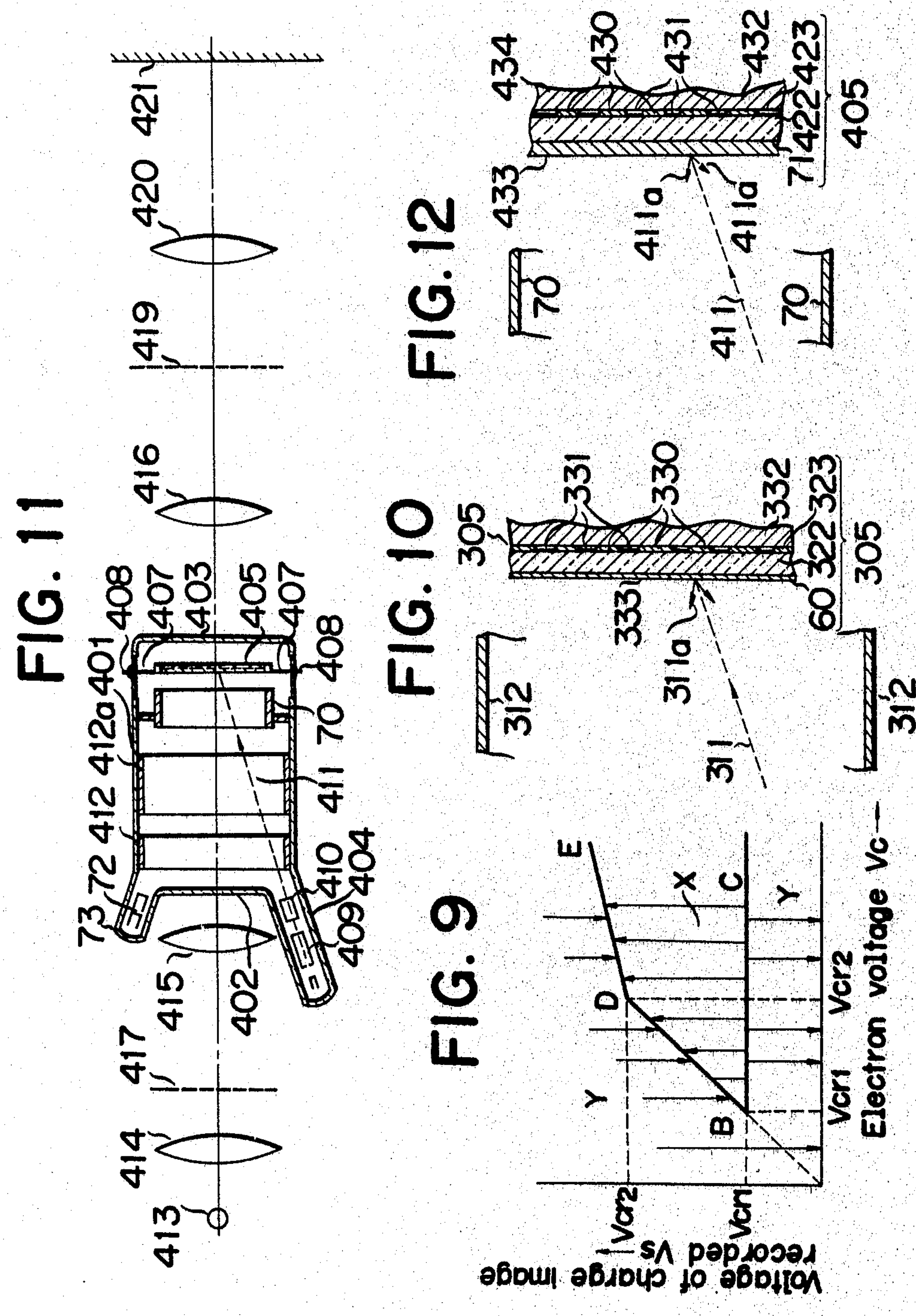
FIG. 10 is a diagram of a still further modification of this invention.
FIG. 11 is a diagrammatic representation of another example of the image recording and projecting device embodying this invention.
FIG. 12 is an enlarged sectional view of the lightmodulating member shown in FIG. 11.

The following description refers to still another modification of this invention which has an object to increase the modulation efficiency by decreasing as far as possible the quantity of electron beam required for deforming the light modulating membrane. FIG. 10 is an enlarged view of an improved light modulating member 305 over that shown in FIGS. 1 and 2. Other components of the vacuum tube are identical to those shown in FIGS. 1 and 10. Components shown in FIG. 10 are designated by numbers obtained by adding 300 to numbers of corresponding components shown in FIGS. 1 and 2. According to the improvement shown in FIG. 10 a thin film 60 of a dielectric substance is formed on a substrate 322 to be utilised as a recording surface 333. Other components, viz. a solid substrate 322, a grid shaped thin film electrode 323 and a light modulating membrane 332 are identical to those shown in previous embodiments. In this modification a dielectric film 60 is provided on one surface of a glass substrate 322 by depositing calcium fluoride having a higher secondary electron emission ratio than the substrate to a thickness of 100 angstrom units. As this dielectric film 60 is bombarded by the electron beam the surface thereof comprises the recording surface 333.

When scanning this recording surface 333 with an electron beam modulated by an image signal the electron beam is imparted with an energy assuring the maximum secondary electron emission ratio $\delta$ of the dielectric film 60. And the potential of the cylindrical thin film electrode 312 on the same side as the recording surface 333 is made higher than that of the grid shaped thin film electrode 333, for example at about 300 v. Then substantially all the secondary electrons 311*a* emitted from the dielectric film 60 as a result of scanning by electron beam 311 will be absorbed by the film electrode 312. Consequently, a positive charge pattern having a charge proportional to $I(\delta-1)$ would be resulted where I represents the current of the scanning electron beam. For this reason, to form a charge pattern, as the secondary electron emission ratio $\delta$ of the material comprising the insulator film 333 increases the current I of the scanning electron beam could be reduced, thus making more easy focussing of the electron beam. In this manner a positive charge pattern could be formed on the surface of the dielectric film 60 with smaller electron beam current I.

Where the image signal to be recorded is a television signal the charge pattern formed on the recording surface 333 of the dielectric film 60 must be discharged through the grid shaped thin film electrode 323 until the next frame is scanned. To this end the dielectric film 60 and the substrate 322 must be made of materials of suitable resistivity. Further, in order to provide clear charge pattern recorded on the recording surface 333 the resistance along this surface must be high. Where a glass plate having a thickness of about several microns is used as the substrate and a film of calcium fluoride of about 100 angstrom thick as the dielectric thin film 60, the resistivity of the material suitable for discharging the charge pattern to the grid shaped thin film electrode 323 is determined by the thickness of the substrate 322 having larger thickness. When the resistance value of the substrate 322 is selected to a suitable value the recorded charge pattern can be discharged within a predetermined time. On the other hand, since the secondary electron emission ratio is determined mainly by the dielectric film 60 it is possible to reduce the scanning electron beam current by fabricating the film 60 with a high resistance substance of high secondary electron emission ratio. As a consequence, focussing of electron beam is made easy thus forming sharply defined charge images. Moreover as the surface resistance of the dielectric film 60 or of the recording surface 333 on which the charge pattern is formed is sufficiently high, the discharge of the charge pattern along the recording surface 333 is less thus contributing to the formation of clear images. Although in this embodiment the dielectric film 60 of calcium fluoride is formed on the glass substrate 322 any other substances may be utilised as long as they can satisfy above described conditions. When the thickness of the dielectric film 60 is increased to about one micron it is possible to store or memorize the charge image formed on the thin film 60 or recording surface 333 over several hours without any appreciable change. Then the recording surface 333 operates as the charge image storing surface.

The electrostatic field created between the charge image recorded on the recording surface 333 and conductor 330 of the grid shaped thin film electrode 323 is also applied across the light modulating membrane 332 through gaps 331 between conductors 330 to deform the membrane. Since the photomodulating membrane 332 is disposed in the Schlieren optical system the image will be enlarged and projected upon the screen in the same manner as above described. When at least one side of the substrate is formed with a dielectric substance, various advantages are created. This construction can also be applied to embodiments shown in FIGS. 1 and 2, FIGS. 5, 6 and 7. Thus at least one side of each substrates shown in the respective embodiments may be made of a dielectric substance capable of emitting secondary electrons.

FIGS. 11 and 12 show another embodiment of this invention wherein the image recording and projecting vacuum tube is furnished with a function of storing the recorded image as well as an ability of erasing the stored charge image. In this modification the same Schlieren optical system as those previously described is used but the image recording and projecting vacuum tube is slightly modified. In FIGS. 11 and 12 components corresponding to those shown in FIGS. 1 and 2 are designated by numbers obtained by adding 400 to corresponding numbers. More specifically, a cylindrical vacuum envelope 70 of glass contains a photomodulating member 405 and other various components. It is desirable that face plates 402 and 403 on both ends of the vacuum tube 401 are both transparent. Where a reflection type Schlieren optical system is utilized as the projecting optical system only the face plate 403 should be transparent. At one end the vacuum envelope 101 are provided cylindrical necks 404 and 73 respectively containing electron guns 409 and 72. The vacuum tube 401 is sealed off type. An electron beam emitted from electron gun 407 is modulated by a television signal, for example, accelerated, focused and deflected to perform scanning by means of a deflection electrode means 40. The electron beam emitted from the electron gun 72 is not focused so that it will speed over a wide area. Electroconductive film electrodes 412*a* are formed on the inner surface of the cylindrical portion of the vacuum tube 401 followed by a cylindrical electrode 70. A light modulating member 405 is disposed between the electrode 70 and the face plate 403 to divide the interior of the vacuum chamber 401 into two chambers. The light modulating member 405 is coupled to the vacuum tube 401 in the same manner as in FIG. 1. The light modulating member 405 is substantially the same as that illustrated in FIG. 1. Thus the substrate 405 is comprised by a disc having a thickness of 5 microns and a diameter of 5 cm. A grid shaped thin film electrode 423 having conductors 430 at a density of more than 400 conductors, 1 cm. is provided on one side of the substrate 405, and a methyl silicone oil is applied on the surface of the grid shaped thin film electrode 423 to form a light modulating membrane having a thickness of about one micron. On the other surface of the substrate 422 is deposited a dielectric thin film 71 of magnesium fluoride to a thickness of about one micron which is thicker than that shown in FIG. 10.

The light modulating member 405 is connected to a metal ring 408 forming a portion of the cylindrical portion of the vacuum tube 401 via a metal frame 407 welded to the periphery of the glass disc 422 with the dielectric thin film 71 faced to electron guns 409 and 72. Thus the grid shaped thin film electrode 423 is electrically connected to the metal ring 408.

The image recording and projecting device shown in FIGS. 11 and 12 operates as follows. The operation of this device can be classified into three operations of image recording, projecting and erasing. A source of potential, not shown, applies —2 kv. to the cathode electrode of the electron gun 409, 150 v. to the thin film electrode 412, several tens volts to the conductive film electrode 412*a*, 200 v. to the metal cylinder electrode 70 and 0 volt to the grid shaped thin film electrode 423.

The recording operation is performed by causing the electron beam emitted by the electron gun and modulated in accordance with the television signals to scan the recording surface 433 on the dielectric film 71 during one frame period by means of the deflector 410.

In this case, if the dielectric film 71 were uniformly maintained at zero voltage the electron voltage of electron beam 411 impinging upon the recording surface 433 would be about 2 kv. Because the secondary electron emission ratio δ of the dielectric film 71 is higher than unity, secondary electrons 411a emitted would be collected by the cylindrical electrode 70 thus positively charging the recording surface 433 of the dielectric film. The quantity of charge at various portions of the recording surface 433 corresponds to the intensity of the electron beam at the time of its bombardment thus recording a charge pattern corresponding to the television image signal. The electrostatic field created by this charge pattern or potential pattern and the conductive cylinder 430 of the grid shaped electrode 423 will also be impressed across the light modulating membrane 423 thus corrugating its surface 434 in accordance with the image.

The projecting operation is performed by the Schlieren optical system in the same manner as in the previous embodiments. Thus, a visible image corresponding to one frame of the signal will appear on the screen 421 which can be continuously viewed as long as the charge pattern is stored on the recording surface 433.

Erasion of the image is performed by erasing the image pattern stored on the recording surface 433 at a proper time.

Actually, an electron beam emitted from electron gun 72 is utilised.

More specifically, the cathode electrode of the electron gun 72 is maintained at zero potential so that the electron beam emitted therefrom may be caused to uniformly impinge upon the entire surface of the recording surface 433 by the action of electroconductive thin film electrodes 412 and 412a and a cylindrical metal electrode 70.

The electron voltage of the electron beam as it arrives at the dielectric film 71 is equal to the charge potentials pattern created on the recording surface 433 according to the recording operation. If this potential were sufficiently low at any portion on the dielectric film 71 or if the electron voltage of the electron beam were sufficiently low, the secondary electron emission ratio would be smaller than unity so that the surface of the dielectric film 71 would be negatively charged and the entire surface would become zero volt to erase the charge pattern, thus restoring the condition before recording.

If the potential of some portion of the surface of the dielectric film 71 were sufficiently high the electron voltage of the electron beam would cause a larger than unity secondary electron emission ratio, then just prior to the irradiation of the recording surface 433 with the electron beam from the electron gun the grid shaped thin film electrode 423 would be made sufficiently negative and gradually restored to zero voltage after initiation of the electron beam irradiation.

Then, prior to irradiation by the electron beam the potential of the recording surface 433 will be sufficiently decreased to decrease the secondary electron emission ratio to less than unity. Thus, upon initiation of the electron beam irradiation, every part of the recording surface 433 will be charged negatively so that it is possible to make zero volt the entire portion of the recording surface 433 when the potential of the grid shaped electrode 423 is restored to zero voltage.

While in the above described embodiments recording and projection of a television signal of one frame has been described, by repeating recording and erasing operations it is possible to continuously project a television image. In this case, it is possible to adjust the operation of the electron beam 73 in such a manner that the charge recorded on the dielectric film 71 is erased before recording the next image and that the deformation of the photomodulating film 432 is restored to the original state before next recording operation. Then very bright projected image can be obtained.

Where it is desired to display a radar signal and the like by suitably adjusting the intensity of the erasing electron beam to suitably weaken the charge erasing action it becomes possible to clearly indicate the trace of an object or a target.

While it has been stated that the electron beam emitted from the electron gun 73 is divergent to flood the entire surface of the recording surface 433 on the dielectric film 71 it becomes possible to selectively erase only the desired portions of the projected image by incorporating a focusing and deflecting means to the electron gun 73. Further, in the case of projecting a television picture image by causing the image erasing electron beam to scan in advance to the image recording electron beam far brighter projected image can be produced.

As shown in FIG. 7 addition of a metal mesh electrode to one end of the cylindrical metal electrode 70 for collecting the secondary electrons further improves collecting efficiency of the secondary electrons as well as the uniformity of the flooding electron beam from the electron gun.

While independent image recording electron gun 409 and image erasing electron gun 72 have been shown and described they can be combined into a single gun where a suitable switching device between recording and erasing operations as provided.

In FIG. 12, while a dielectric film 71 has been formed on the substrate 422, this dielectric film may be eliminated provided that the substrate 422 has the desired secondary electron emission ratio δ.

The field of application of the novel device can be broadened by the provision of a suitable means that records and stores the desired charge image on a portion on which the image is formed and erases the stored image at the desired time.

Thus this invention provides a novel image recording projecting device having many advantages.

In view of the above, it will be evident that many modifications and variations of the invention are possible in light of the above teaching. It, therefore, is to be understood that within the appended claims the invention may be practiced otherwise than as specifically described.

What we claim is:

1. A projecting device comprising an electron gun supplied with image signals, a vacuum tube including a sealed-off envelope containing said electron gun, a substrate contained in said envelope and provided with a recording surface upon which a charge pattern is to be recorded when an electron beam modulated by said image signal is projected by said electron gun, a grid-shaped thin film electrode supported by the other surface of said substrate and provided with numerous regularly spaced gaps, a light modulating membrane formed on said thin film electrode and adapted to be deformed so as to form a corrugation corresponding to said charge pattern on the surface thereof by the action of an electrostatic field that has passed through said gaps of said electrode, a source of light to irradiate said lightmodulating membrane with a light flux, and a projecting optical system adapted to project the light flux modulated by the deformation of the surface of said membrane upon a screen, thus focusing thereon an image corresponding to said image signal.

2. The projecting device according to claim 1 wherein said vacuum tube, said substrate and said lightmodulating membrane are made of light transmissive materials, and said optical system is the Schlieren optical system by means of which a light beam is projected upon said light-modulating membrane through a substrate provided on the back thereof and after being modulated by the deformation of said lightmodulating membrane and light flux is projected on a screen.

3. A projecting device according to claim 1 wherein said lightmodulating membrane includes a light reflecting film at its side closer to said electrode so as to reflect said light flux irradiated thereon toward said screen.

4. The projecting device according to claim 1 wherein said recording surface of said substrate is made of a dielectric film having a high secondary electron emission ratio.

5. A projecting device according to claim 1 wherein there is added means to switch the polarity of said charge image recorded on said recording surface of said substrate between positive and negative.

6. A projecting device according to claim 1 wherein the device further includes means to irradiate said charge image recorded and stored in the recording surface of said substrate with said electron beam to erase said charge image.

References Cited

UNITED STATES PATENTS

| | | | |
|---|---|---|---|
| 2,454,488 | 11/1948 | Sukumlyn | 313—91 |
| 2,896,507 | 7/1959 | Mast | 350—161 |
| 2,910,532 | 10/1959 | Auphan | 313—91 |
| 3,284,661 | 11/1966 | Rosendahl | 350—161 |

ROBERT L. GRIFFIN, Primary Examiner

H. W. BRITTON, Assistant Examiner

U.S. Cl. X.R.

313—91; 350—161